United States Patent
Grimandi et al.

(10) Patent No.: US 10,015,988 B2
(45) Date of Patent: Jul. 10, 2018

(54) COUPLING UNIT AND METHOD FOR INSERTING A SUPPORT FITTED WITH A HYGROSCOPIC PAD IN A BASE DURING THE MANUFACTURE OF A DISPOSABLE CARTRIDGE FOR AN ELECTRONIC CIGARETTE

(71) Applicant: G.D. SOCIETA' PER AZIONI, Bologna (IT)

(72) Inventors: Andrea Grimandi, Ozzano Emilia (IT); Enrico Medina, Bologna (IT); Luca Lanzarini, Crespellano (IT); Massimo Sartoni, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 239 days.

(21) Appl. No.: 14/975,996

(22) Filed: Dec. 21, 2015

(65) Prior Publication Data
US 2016/0183595 A1    Jun. 30, 2016

(30) Foreign Application Priority Data

Dec. 22, 2014    (IT) .............................. BO2014A0718

(51) Int. Cl.
 *B23P 11/00* (2006.01)
 *A24F 47/00* (2006.01)
 *B23P 19/04* (2006.01)
 *B23P 19/00* (2006.01)

(52) U.S. Cl.
 CPC .......... *A24F 47/008* (2013.01); *B23P 19/001* (2013.01); *B23P 19/04* (2013.01)

(58) Field of Classification Search
 CPC ........... B23P 11/00; B23P 13/00; B23P 19/00; B25B 11/00; B25B 11/004
 See application file for complete search history.

(56) References Cited

U.S. PATENT DOCUMENTS

| 6,065,201 | A  | * | 5/2000  | Sakai   | B23K 3/0623 228/245   |
| 8,556,245 | B2 | * | 10/2013 | Sueoka  | G01M 13/04 198/370.01 |
| 8,814,153 | B2 | * | 8/2014  | Toncelli | B25B 11/005 269/100  |

(Continued)

FOREIGN PATENT DOCUMENTS

| CN | 201758770 U    | 3/2011 |
| EP | 2 779 786 A1   | 9/2014 |
| WO | WO-2013/076750 A1 | 5/2013 |

*Primary Examiner* — Lee D Wilson
(74) *Attorney, Agent, or Firm* — Marshall, Gerstein & Borun LLP

(57) ABSTRACT

A coupling unit and method for inserting a support fitted with a hygroscopic pad in a base during the manufacture of a disposable cartridge for an electronic cigarette; are provided: a first seat that accepts the support fitted with the hygroscopic pad; a second seat that accepts the base and can be axially aligned with the first seat; a transfer device that inserts the support fitted with the hygroscopic pad in the base by applying a relative axial movement between the support fitted with the hygroscopic pad and the base; and a suction device, which is coupled to a first end of the base opposite to a second end of the base through which the support fitted with the hygroscopic pad enters, and causes suction that acts inside the base.

9 Claims, 16 Drawing Sheets

(56) References Cited

U.S. PATENT DOCUMENTS

| | | | |
|---|---|---|---|
| 2008/0012189 A1* | 1/2008 | Manz | B23K 26/0066 |
| | | | 269/21 |
| 2008/0127474 A1* | 6/2008 | McAllister | B23Q 1/035 |
| | | | 29/33 K |
| 2011/0062641 A1* | 3/2011 | Sato | B65G 49/061 |
| | | | 269/21 |
| 2014/0270730 A1 | 9/2014 | DePiano et al. | |
| 2015/0289565 A1* | 10/2015 | Cadieux | A24F 47/002 |
| | | | 131/328 |
| 2016/0073684 A1* | 3/2016 | Mironov | A24F 47/006 |
| | | | 131/58 |
| 2016/0183595 A1* | 6/2016 | Grimandi | A24F 47/008 |
| | | | 29/428 |

* cited by examiner

COUPLING UNIT AND METHOD FOR INSERTING A SUPPORT FITTED WITH A HYGROSCOPIC PAD IN A BASE DURING THE MANUFACTURE OF A DISPOSABLE CARTRIDGE FOR AN ELECTRONIC CIGARETTE

TECHNICAL FIELD

The present invention relates to a unit and to a method for inserting a support fitted with a hygroscopic pad in a base during the manufacture of a disposable cartridge for an electronic cigarette.

PRIOR ART

Recently an electronic cigarette has been proposed (described, for example, in patent applications WO2014058678A1 and WO2014088889A1) comprising a cylindrical shaped reusable part that is used several times and contains, among other things, an electric battery (which provides energy necessary for the electronic cigarette to operate) and an electronic processor which supervises the operation of the electronic cigarette. In addition, the electronic cigarette comprises a single-use cartridge (i.e. disposable and therefore used only once and is then replaced) and cylindrical onto shape which is screwed to the reusable part.

The cartridge comprises a support, which is made of plastic material (electrically insulating) and is inserted inside an internally threaded metal base to obtain the mechanical coupling with the corresponding reusable part of the electronic cigarette. The support carries two power electrodes arranged at the sides and having a greater axial extent and a signal electrode arranged centrally (i.e. between the two power electrodes) and having a smaller axial extent (with respect to the two power electrodes). A heating member is electrically connected to the two power electrodes comprising a 'U'-folded wick of electrically insulating material and a heat resistor made of a filament wound in a spiral about the wick; at the two opposite ends of the filament two terminals are formed which are electrically connected to corresponding power electrodes by means of welding.

Between the two power electrodes a supporting body of ceramic material (or similar) is arranged, which rests laterally on both power electrodes and carries centrally an electronic circuit, which is electrically connected to the signal electrode and comprises, among other things, a memory.

Finally, inside the base a hygroscopic pad (e.g. a cotton wool pad) is also arranged which is impregnated with a viscous liquid substance containing the nicotine and possible flavorings. The hygroscopic pad has a cylindrical tubular shape and is surrounding the heat resistance of the heating member so that in use the heat generated by the heating member heats the hygroscopic pad causing the slow volatilization (vaporization) of the viscous liquid substance that impregnates the hygroscopic pad.

In patent application BO2014A000663 a machine is described for inserting a support fitted with a hygroscopic pad in a base comprising a transfer station, at which a gripping head of a first feed conveyor that carries a support fitted with the heating member and with the hygroscopic pad folded into a tube is axially aligned with a seat of a second feed conveyor that carries an empty base; the transfer station comprises a pusher that with an axial movement enters in the gripping head to extract the support fitted with the heating member and with the hygroscopic pad folded into a tube and then inserts the support fitted with the heating member and with the hygroscopic pad folded into a tube into the base. To facilitate entering the hygroscopic pad folded into a tube into the base, the gripping head of the first feed conveyor has internally a flared shape that progressively reduces its size at an exit end through which the support protrudes from the gripping head itself; in other words, the flared shape of the gripping head compresses radially the hygroscopic pad folded into a tube (which has the ability to elastically deform without being damaged) in order to facilitate entering into the base.

However, it was observed that with a certain frequency the hygroscopic pad folded into a tube does not entirely enter inside the base (i.e. a flap of the hygroscopic pad remains out from the base and protrudes from the base itself) inhibiting a correct mechanical coupling between the support and the base and thus making the cartridge unusable (that is, the cartridge in which a part of the hygroscopic pad protrudes from the base is faulty and needs to be irretrievably discarded). To minimize the formation of defective cartridges (i.e. cartridges in which a part of the hygroscopic pad protrudes from the base) is possible to operate very slowly (i.e. with a very low hourly productivity); however, said solution has the obvious drawback of not being very efficient.

DESCRIPTION OF THE INVENTION

The object of the present invention is to provide a unit and a method for inserting a support fitted with a hygroscopic pad in a base during the manufacture of a disposable cartridge for an electronic cigarette, which method and unit allow to achieve high productivity and are, at the same time, easy and inexpensive to manufacture.

According to the present invention a unit and a method are provided for inserting a support fitted with a hygroscopic pad in a base during the manufacture of a disposable cartridge for an electronic cigarette, as claimed in the attached claims.

BRIEF DESCRIPTION OF THE DRAWINGS

The present invention will now be described with reference to the accompanying drawings, which illustrate a non limitative embodiment, wherein.

PREFERRED EMBODIMENTS OF THE INVENTION

Figure 1:
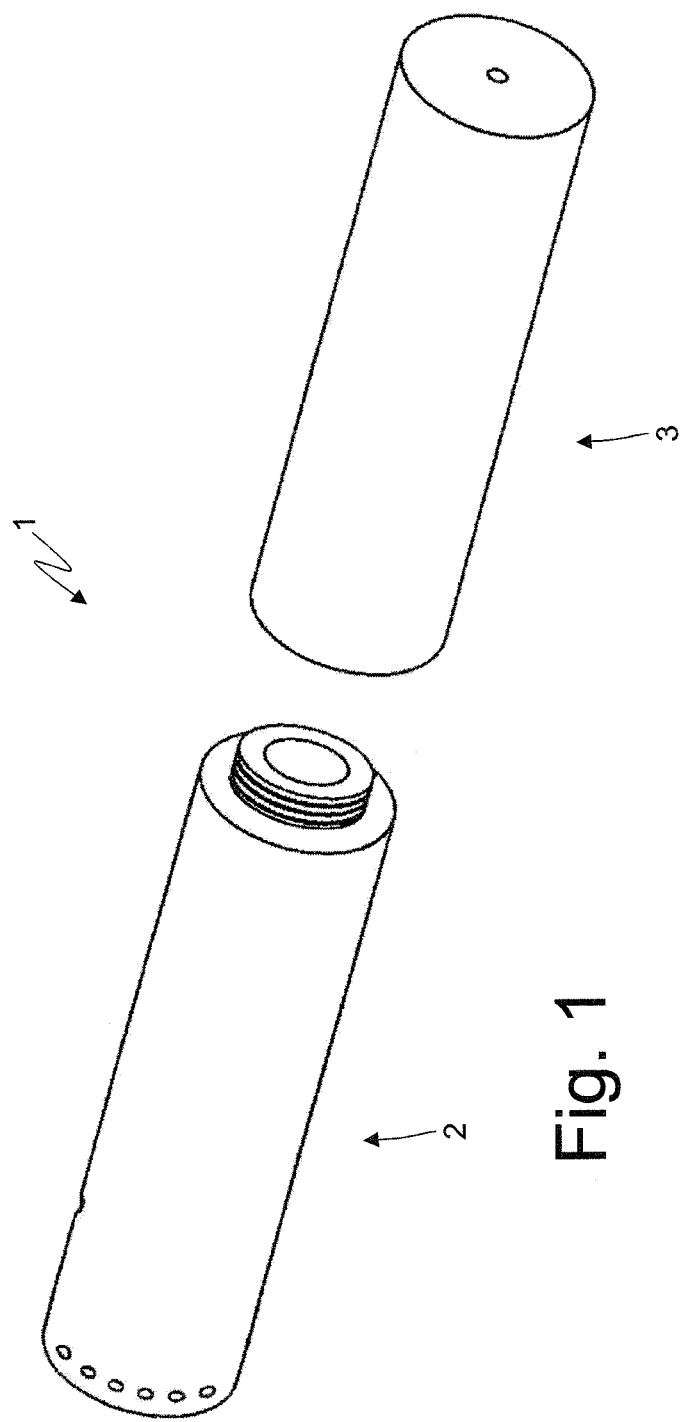
FIG. 1 is a perspective and schematic view of an electronic cigarette fitted with a cartridge.

In FIG. 1, number 1 indicates as a whole an electronic cigarette of known type (described, for example, in patent applications WO2014058678A1 and WO2014088889A1).

The electronic cigarette 1 comprises a reusable part 2 cylindrical in shape that is used several times and contains, among other things, an electric battery (which provides the energy required for the electronic cigarette 1 to operate) and an electronic processor which supervises the electronic cigarette 1 operation. In addition, the electronic cigarette 1 comprises a single-use cartridge 3 (i.e. disposable and therefore used only once and then replaced) and cylindrical in shape which is screwed to the reusable part 2.

Figure 2:
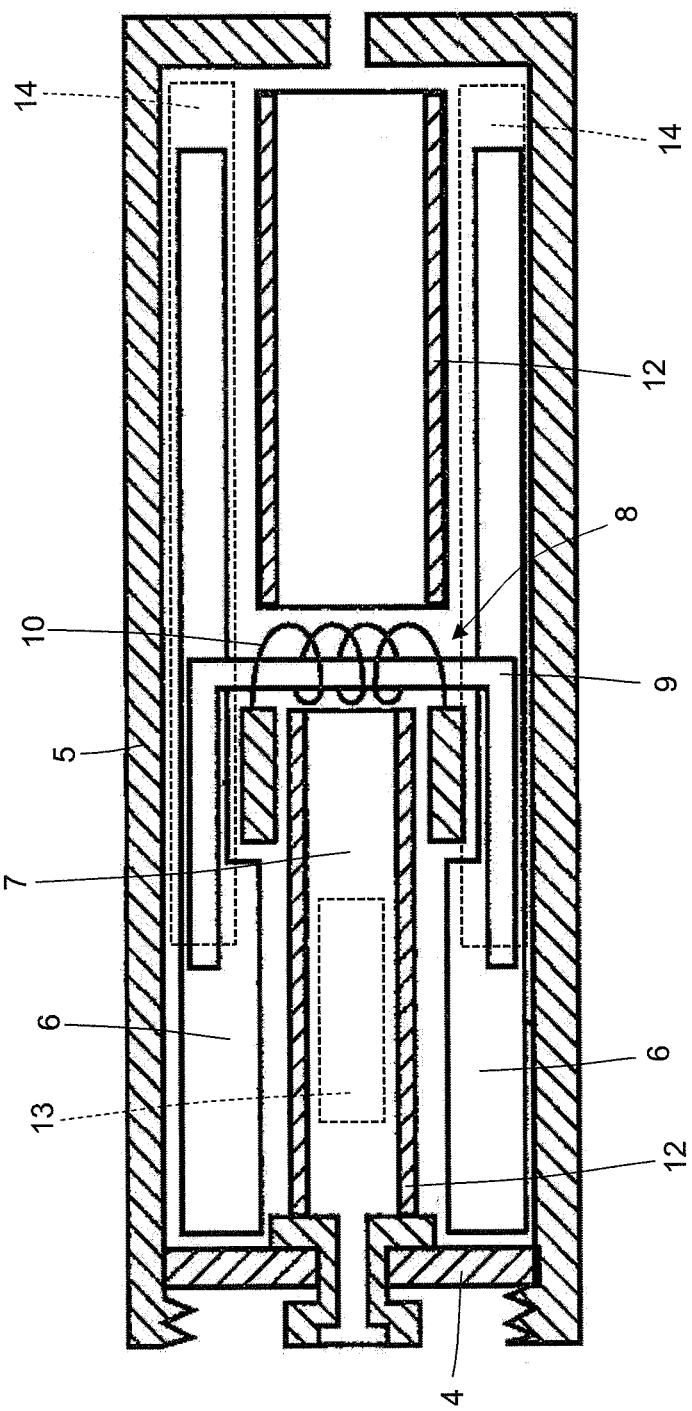
FIG. 2 is a longitudinal sectional and schematic view of the cartridge of FIG. 2.
Figure 3:
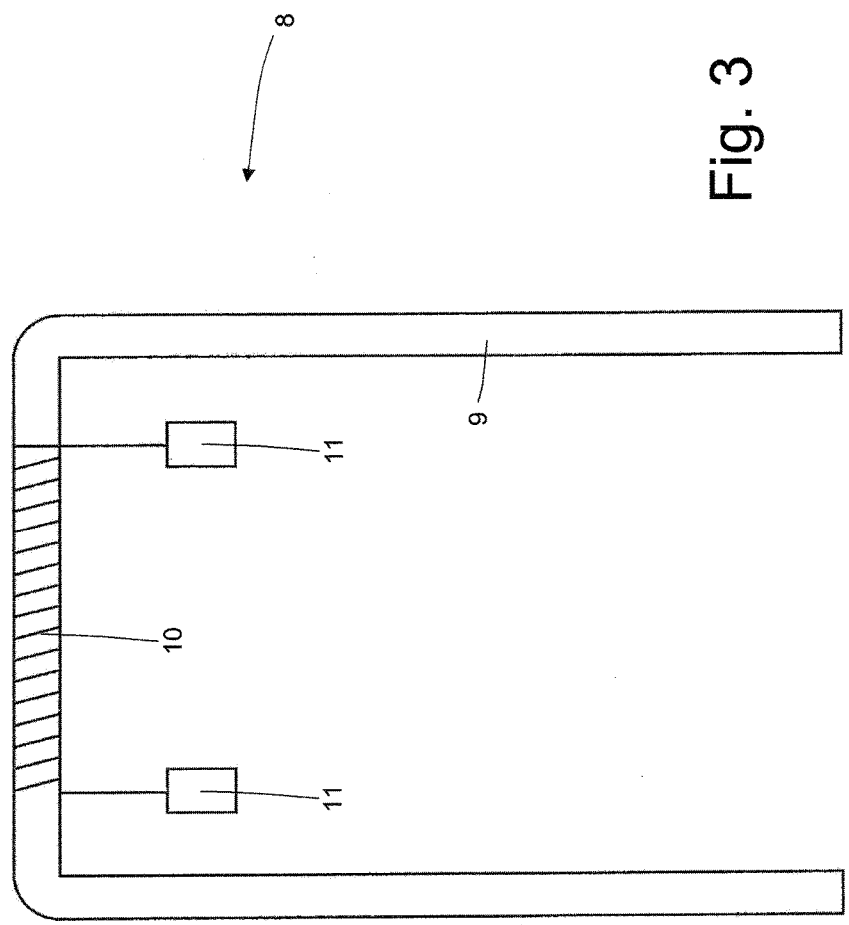
FIG. 3 is a schematic view of a heating member of the cartridge of FIG. 2.
Figure 4:
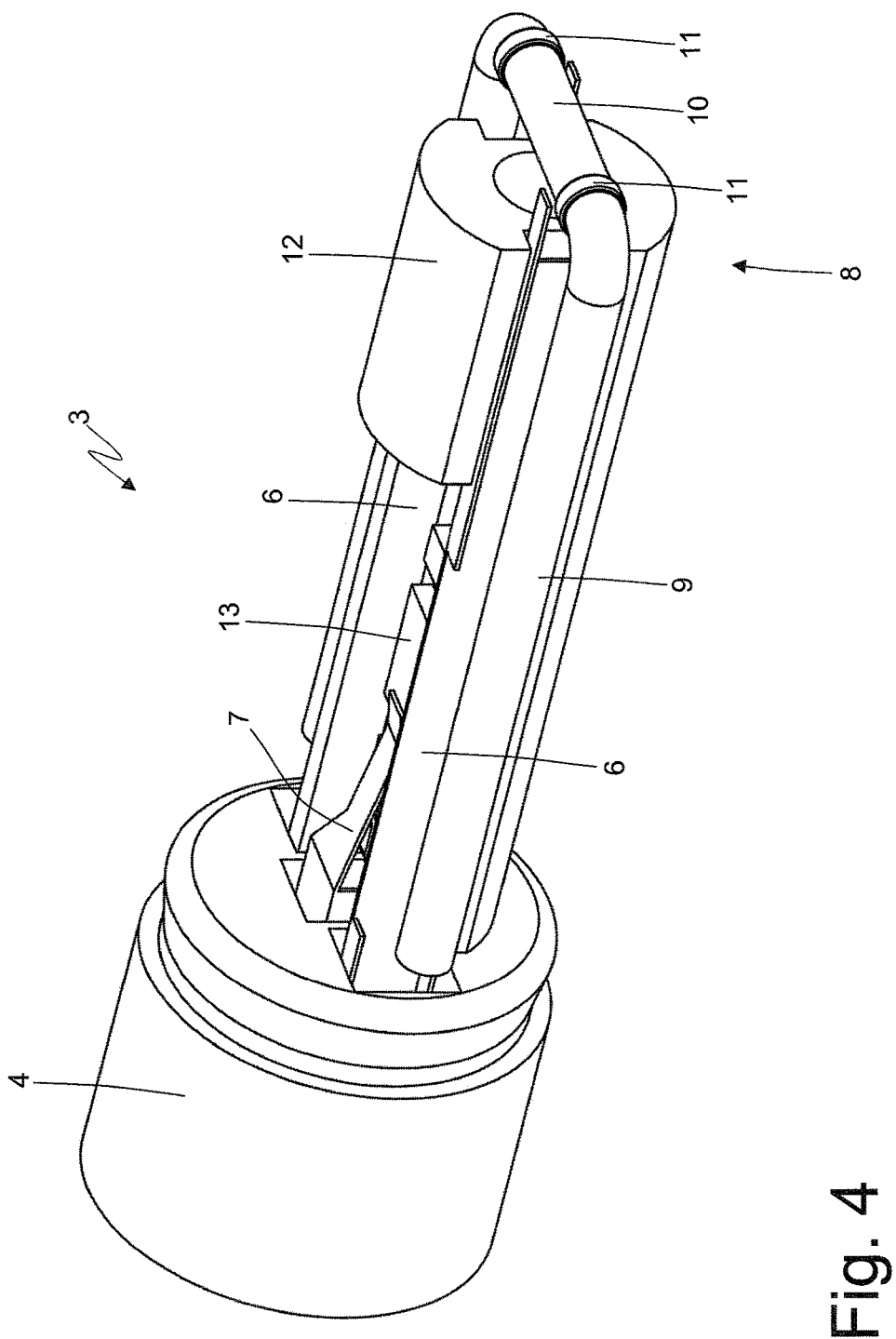
FIGS. 4 and 5 are two different perspective and schematic views of the cartridge of FIG. 2 with the removal of parts for clarity.
Figure 5:
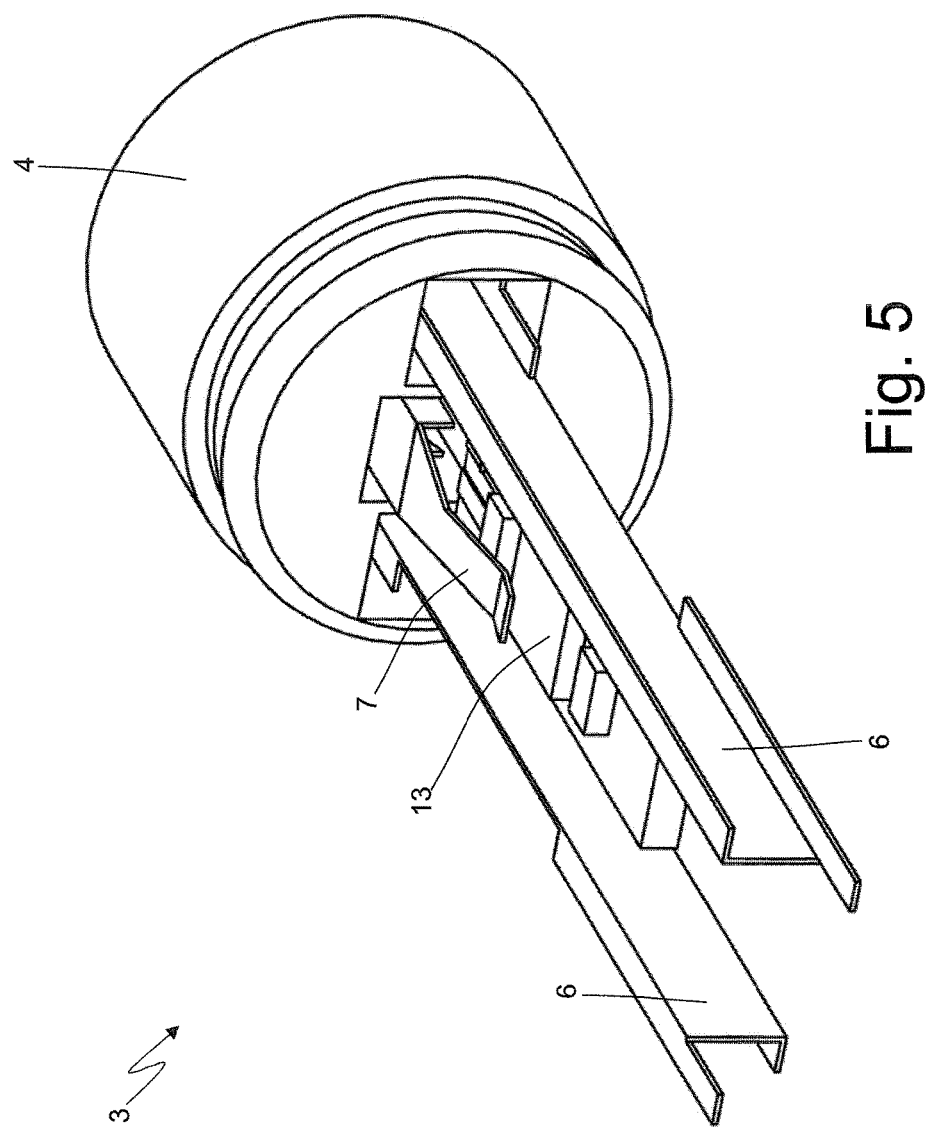

As illustrated in FIG. 2, the cartridge 3 of the electronic cigarette 1 comprises a support 4, which is made of plastic material (electrically insulating) and is at least partly forcibly inserted (i.e. fitted lightly interfering) inside a metal base 5 internally threaded to obtain the mechanical coupling with the corresponding reusable part 2 of the electronic cigarette 1. The support 4 carries two power electrodes 6 arranged at the sides and having a greater axial extent and a signal electrode 7 arranged centrally (i.e. between the two power electrodes 6) and having a smaller axial extent (with respect to the two power electrodes 6). To the two power electrodes 6 a heating member 8 (better illustrated in FIG. 3) is electrically connected, which comprises a U-folded wick 9 of electrically insulating material and a heat resistor 10 formed by a filament wound in a spiral about the wick 9; at the two opposite ends of the filament two terminals 11 are formed which are electrically connected to the corresponding power electrodes 6 by means of welding.

Between the two power electrodes 6 a supporting body 12 of ceramic material (or similar) is arranged, which rests laterally on both power electrodes 6 and centrally carries an electronic circuit 13, which is electrically connected with the signal electrode 7 and comprises, among other things, a memory. The supporting body 12 also has the function of insulating spacer to keep well separated the two power electrodes 6 from each other. Finally, inside the base 5 a hygroscopic pad 14 (e.g. a cotton wool pad) is arranged, which is impregnated with a viscous liquid substance containing the nicotine and possible flavorings. The hygroscopic pad 14 has a cylindrical tubular shape and surrounds the heat resistance 10 of the heating member 8 so that in use the heat generated by the heating member 8 heats the hygroscopic pad 14 causing the slow volatilization (vaporization) of the viscose liquid substance that impregnates the hygroscopic pad 14. In particular, in the embodiment illustrated in FIG. 2 the hygroscopic pad 14 it is arranged (wound) about the two power electrodes 6 (i.e. externally to the power electrodes 6). Preferably, and as better described below, the hygroscopic pad 14 is obtained by ring-folding an initially flat piece of hygroscopic material.

Figure 6:
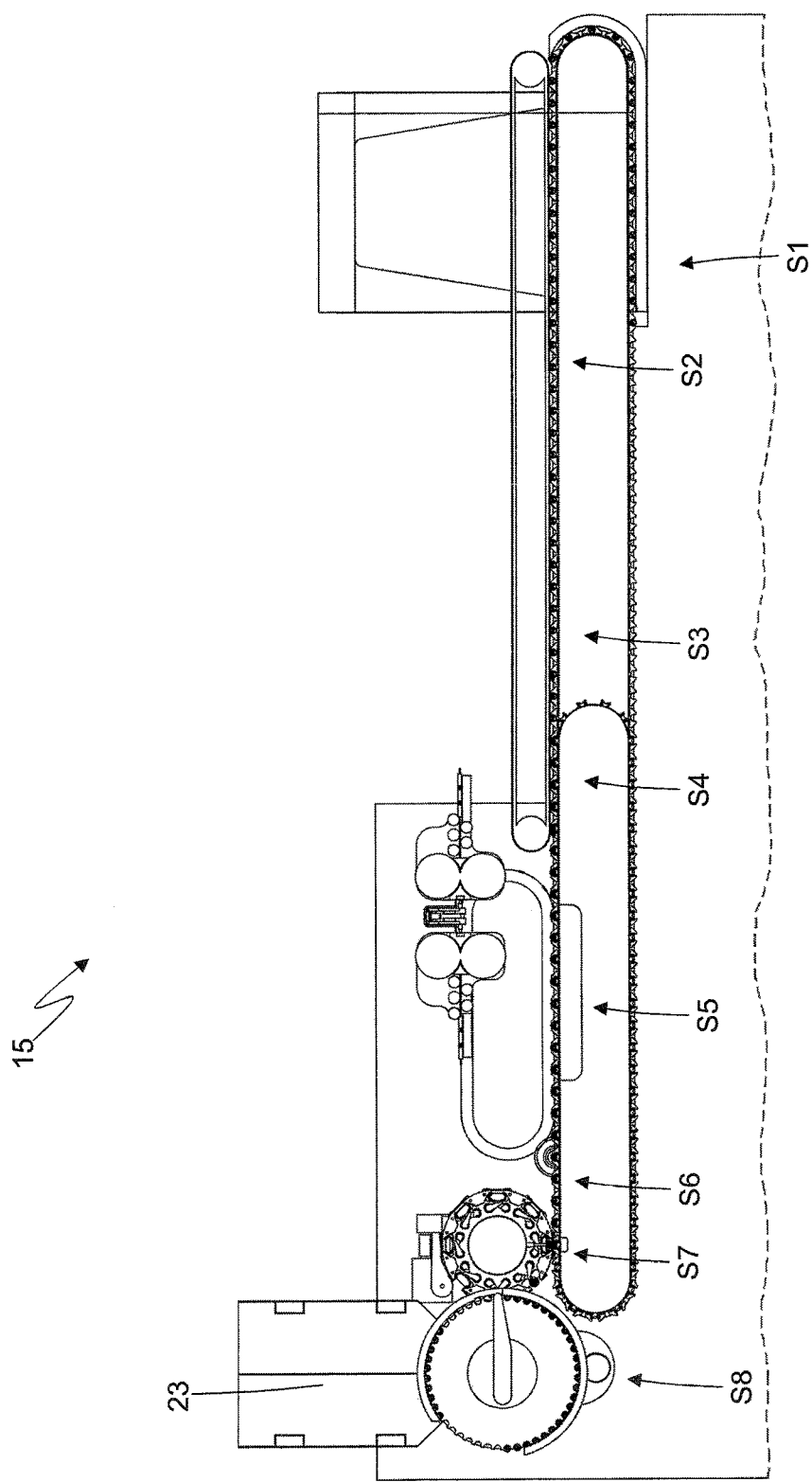
FIG. 6 is a front, schematic view and with the removal of components for clarity, of part of a packaging machine for the production of the cartridge of FIG. 2.

In FIG. 6, reference number 15 indicates as a whole a packaging machine (shown partly in FIG. 6) for the production of cartridges for electronic cigarettes 2 described above. The packaging machine 15 comprises a receiving station S1 for receiving the supports 4, an application station S2 for applying the electrodes 6 and 7, an application station S3 for applying the electronic circuits 13, an application station S4 for applying the supporting bodies 12, an application station S5 for applying the heating members 8, a rotation station S6, an application station S7 for applying the hygroscopic pads 14 and an application station S8 for applying the bases 5.

Figure 7:
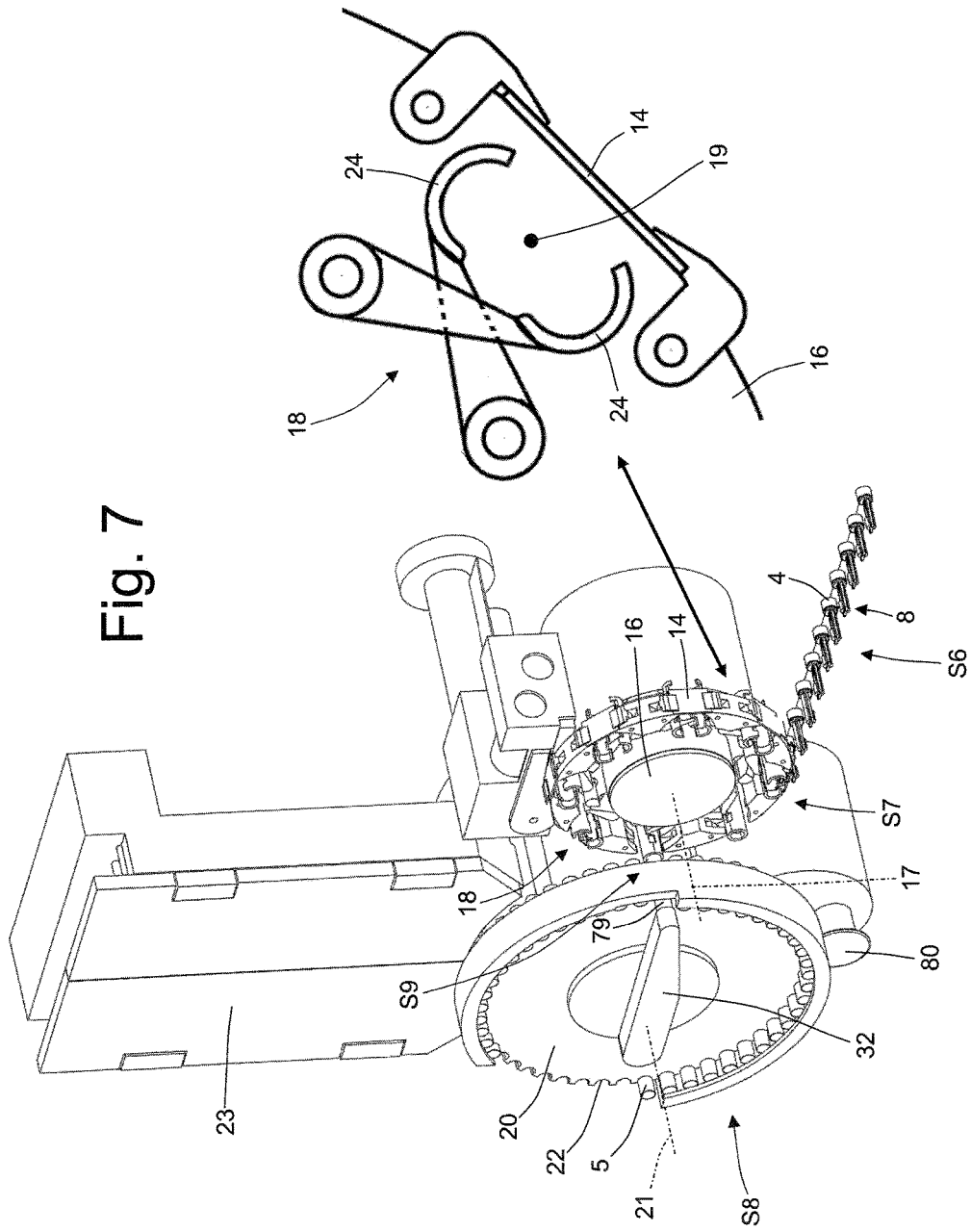
FIG. 7 is a perspective and schematic view of a application station of hygroscopic pads and a subsequent station for the application of the bases of the packaging machine of FIG. 6.
Figure 8:
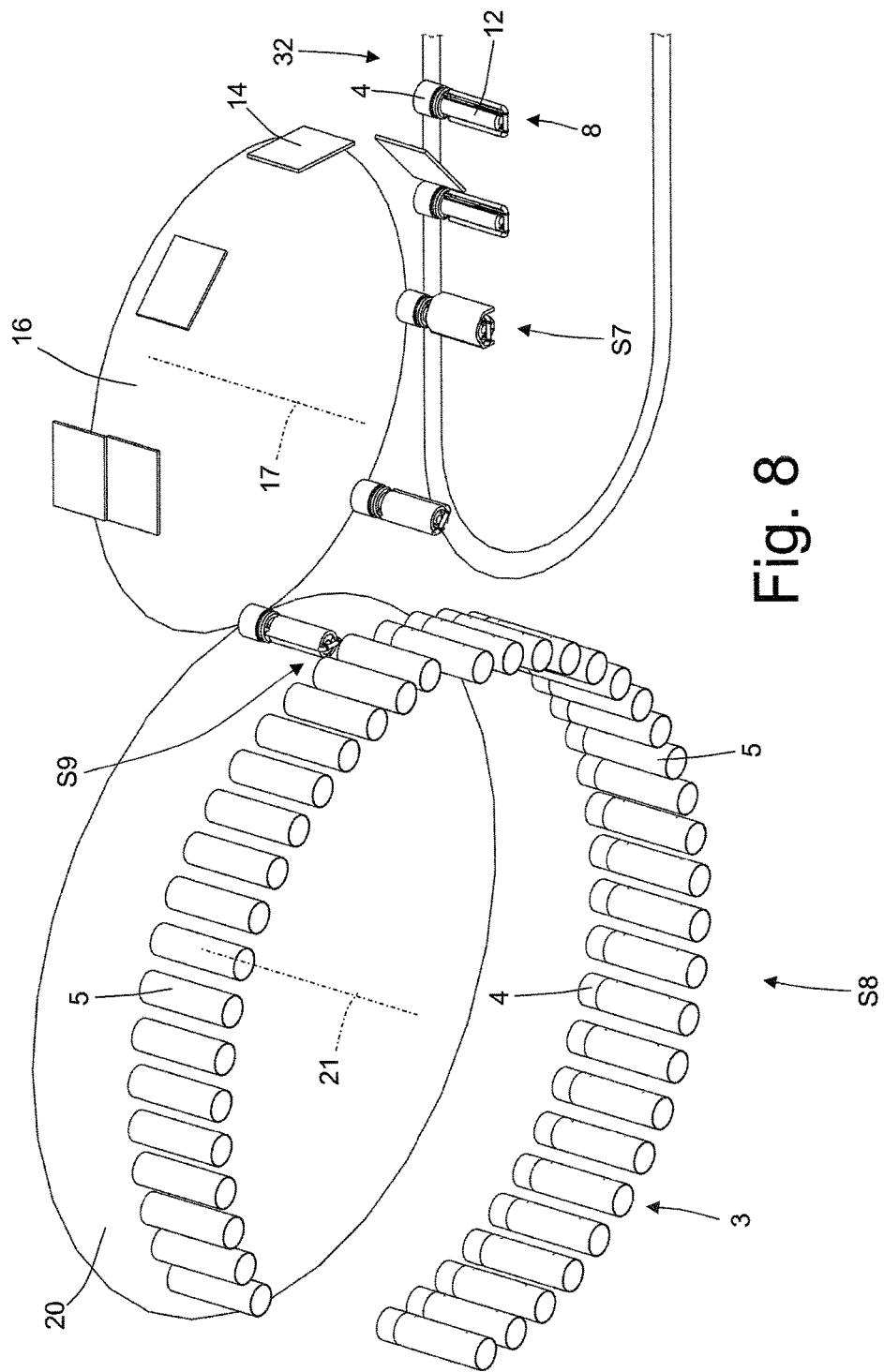
FIG. 8 is a perspective and schematic view that shows the feeding of the materials in the stations of FIG. 7.

As illustrated in FIGS. 7 and 8, the application station S7 for applying the hygroscopic pads 14 comprises a feed conveyor 16, which is shaped as a drum mounted for rotating about a central rotation axis 17 and supporting a plurality of gripping heads 18, each of which defines a seat 19 adapted to contain a corresponding support 4 (fitted with electrodes 6 and 7, electronic circuit 13, supporting body 12 and heating member 8 applied previously). The feed conveyor 16 is arranged over a main conveyor, so that each support 4 (fitted with electrodes 6 and 7, electronic circuit 13, supporting body 12 and the heating member 8 applied previously) can be transferred with a vertical movement from the bottom upwards from a pocket of the main conveyor to a gripping head 18 of the feed conveyor 16.

As illustrated in FIGS. 7 and 8, the application station S8 for applying the bases 5 comprises a feed conveyor 20, which is shaped as a drum mounted for rotating about a central rotation axis 20 and supports a plurality of seats 22, each of which is adapted to contain a corresponding base 5. The feed conveyor 20 is placed next to the feed conveyor 16 (the two rotation axes 17 and 20 are parallel to each other) and partially overlaps the feed conveyor 16 so that a support 4 (fitted with electrodes 6 and 7, electronic circuit 13, supporting body 12, heating member 8 and hygroscopic pad 14 previously applied) can be transferred axially (that is, with a movement parallel to the rotation axes 17 and 20) from the seat 19 of a gripping head 18 of the feed conveyor 16 to a seat 22 of the feed conveyor 20. To the feed conveyor 20 a hopper 23 is coupled which receives a stock of bases 5 from a feeding device of the bases 5; bottom outlet mouths of the hopper 23 are placed at a periphery of the feed conveyor 20 and pushers (for example ten side by side pushers) are provided which have a reciprocating movement along a direction parallel to the rotation axis 21 of the feed conveyor 20 and push cyclically a plurality of bases 5 out of the bottom outlet mouths of the hopper 23 up to the insertion in corresponding seats 22 of the feed conveyor 20.

To each gripping head 18 of the feed conveyor 16 a pocket is coupled, which is placed radially outermost to the gripping head 18 and is adapted to receive and retain a corresponding hygroscopic pad 14 rectangular in shape and initially flat so that the same hygroscopic pad 14 is placed in front of the gripping head 18. The application station S7 for applying the hygroscopic pads 14 comprises an inserter device for inserting each support 4 (fitted with electrodes 6 and 7, electronic circuit 13, supporting body 12 and the heating member 8 previously applied) from a pocket of the main conveyor inside a corresponding gripping head 18 of the feed conveyor 20 by intercepting the hygroscopic pad 14 which is housed in the corresponding pocket and folds into a "U" around the heating member 8 entering the gripping head 18.

As illustrated in FIG. 7, each gripping head 18 has a tubular shape and is composed of two clamshell elements 24 (of semicircular cross section), which are movable with respect to one another between an open position in which the two clamshell elements 24 are arranged at a certain distance from each other and a closed position in which the two clamshell elements 24 are arranged in mutual contact and together define the corresponding seat 19. In particular, in each gripping head 18 two clamshell elements 24 are hinged to the feed conveyor 16 to move with respect to one another by means of corresponding rotations. The clamshell elements 24 of each gripping head 18 are arranged in the open position to allow a radial entering of the support 4 (fitted with electrodes 6 and 7, electronic circuit 13, supporting body 12 and the heating member 8 applied previously) coupled to the hygroscopic pad 14 folded into a "U" and are arranged in the closed position after entering to fold into a tube the hygroscopic pad 14 around the heating member 8.

Between the application station S7 for applying the hygroscopic pads 14 and the application station S8 for applying the bases 5 a transfer station S9 is defined in which a coupling unit 25 (illustrated as a whole in FIG. 11) operates, which extracts axially from the seat 19 of a gripping head 18 the support 4 (fitted, among other things, with the heating member 8 and with the hygroscopic pad 14 folded into a tube) when the clamshell elements 24 of the gripping head 18 are still in the closed position and inserts the support 4 in a corresponding base 5 carried by a seat 22 of the feed conveyor 20.

In the transfer station S9, each seat 22 of the feed conveyor 20 is axially aligned with the seat 19 of a corresponding gripping head 18 of the feed conveyor 16 so that the support 4 (fitted, among other things, with the heating member 8 and the hygroscopic pad 14 folded into a tube) is extracted axially from the seat 19 and inserted axially into the corresponding base 5 carried by a seat 22 of the feed conveyor 20 by means of the action of the coupling unit 25.

Figure 11:
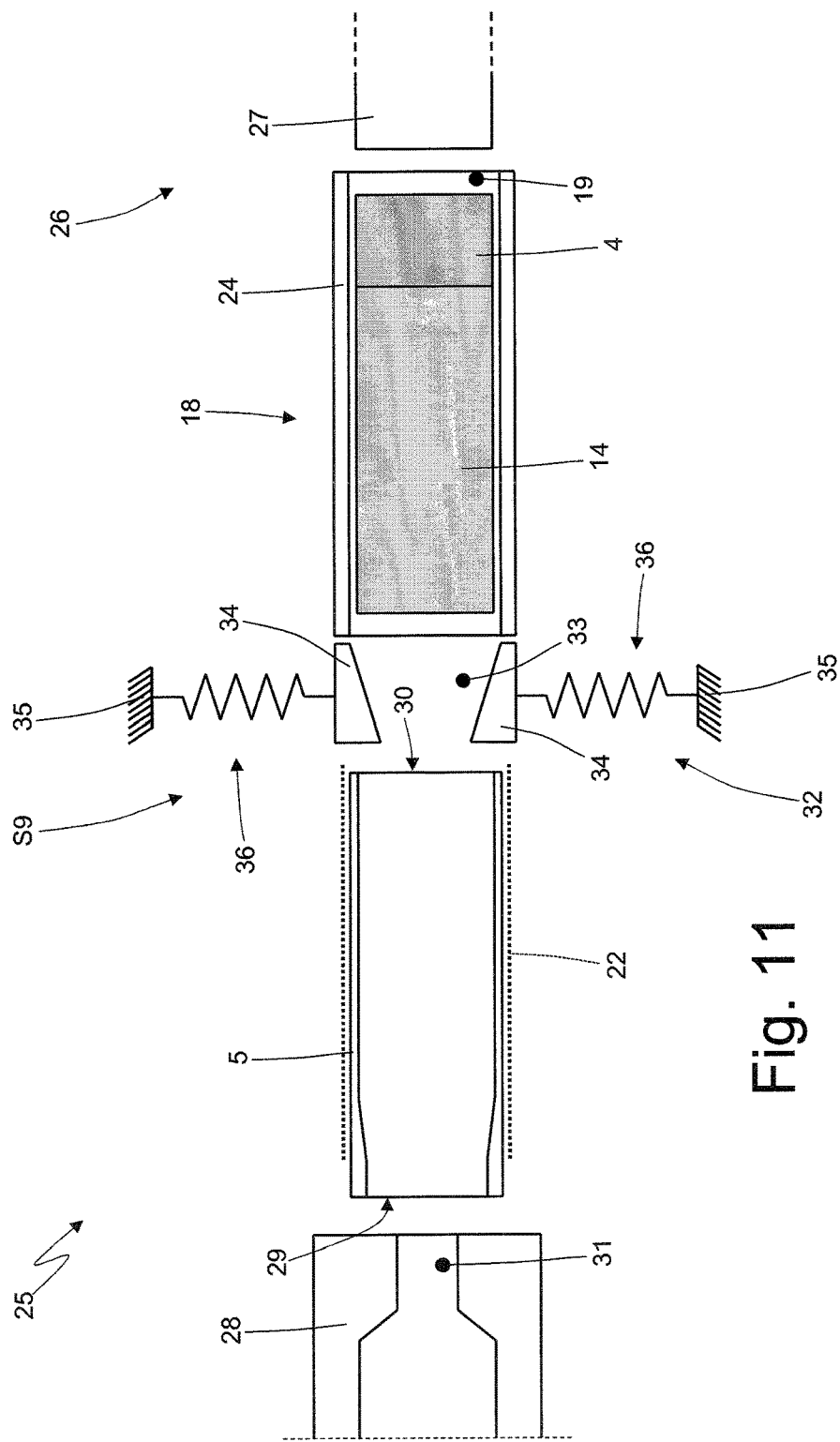
FIGS. 11-14 are four schematic views and in longitudinal section of a coupling unit of the application station of the bases of FIG. 7 in three different moments of an inserting operation of a support fitted with a hygroscopic pad into a base.

As illustrated in FIG. 11, the coupling unit 25 comprises a transfer device 26 that inserts each support 4 fitted (among other things) with the hygroscopic pad 14 in the corresponding base 5. In the preferred embodiment illustrated in FIG. 11, the transfer device 26 comprises a pusher 27 which is movable axially and passes through the seat 19 formed in the gripping head 18 of the feed conveyor 16 to push axially the support 4 (fitted, among other things, with the heating member 8 and the hygroscopic pad 14 folded into a tube) out of the seat 19, and then insert the support 4 itself into the corresponding base 5 carried by a seat 22. In general, the transfer device 26 applies a relative axial movement between the support 4 (fitted, among other things, with the heating member 8 and the hygroscopic pad 14 folded into a tube) carried in a seat 19 and the base 5 carried by a seat 22; then the transfer device 26 can push only the support 4 while holding the base 5 (as illustrated in FIG. 11), can push the base 5 while holding the support 4, or can push both the support 4, and the base 5. As illustrated in FIG. 11, the coupling unit 25 comprises a suction device 28, which is coupled to one end 29 of the base 5 opposite to one end 30 of the base 5 through which the support 4 fitted with the hygroscopic pad 14 enters and causes suction acting inside the base 5. In other words, the suction device 28 rests on the end 29 of the base 5 and activates a suction effecting the inside of the base 5. In particular, the suction device 28 has a suction hole 31, which is in pneumatic connection with a suction source (i.e. with a suction pump) and is arranged in front of a hole formed in the end 29 of the base 5 as illustrated in FIG. 11. Preferably, the suction device 28 comprises an elastically deformable annular seal which is arranged around the suction hole 31 of the suction device 28 and has the function to provide a seal-tight coupling between the suction device 28 and the end 29 of the base 5.

According to a preferred, but not limiting, embodiment, the coupling unit 25 comprises a pneumatic suction pump, which generates a depression due to the Venturi effect by exploiting a flow of compressed air and is pneumatically connected with the suction hole 29 of the suction device 28. A pneumatic suction pump (i.e. with no moving parts and utilizing the Venturi effect for generating a vacuum) generates a depression by exploiting the Venturi effect, whereby the pressure of a fluid current increases with decreasing speed, and then in a fluid current an increase in speed corresponds to a decrease in pressure and vice versa, that is, the increase in pressure corresponds to a decrease in speed. The pneumatic suction pump can be either single stage or multi-stage; in the single stage version the feed compressed air passes through only one Venturi nozzle before being ejected and generates depression on the attachment of the intake circuit, while in the multistage version the feed compressed air passes through two or more Venturi nozzles placed in series ensuring to the intake circuit a greater suction capacity. The use of a pneumatic suction pump is particularly advantageous, since it allows to obtain a very high depression which allows to optimize the operation of the coupling unit 25.

Figure 9:
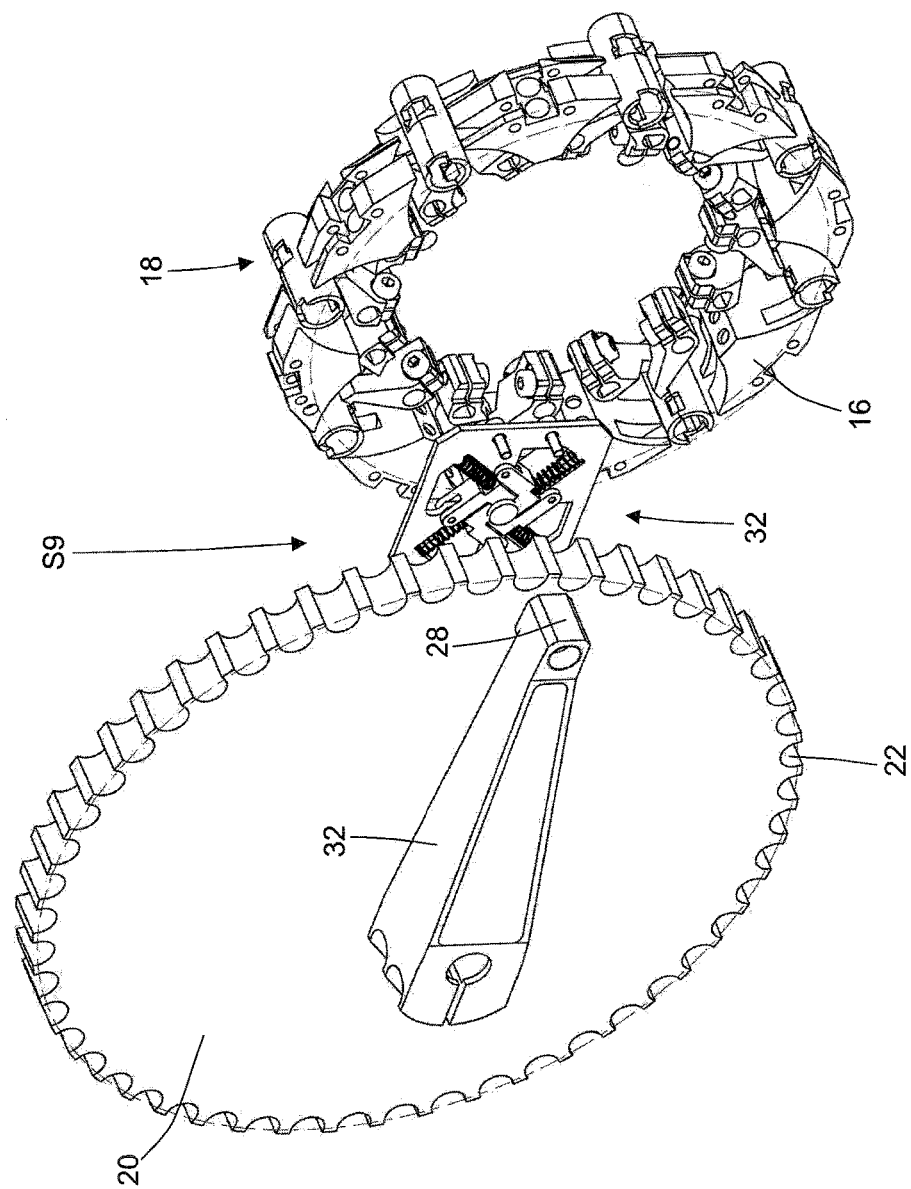
FIG. 9 is a perspective and schematic view of the application station of the bases of FIG. 7.

According to a preferred embodiment, the suction device 28 is movable axially to move closer (normally up to rest on) the end 29 of the base 5 before insertion of the support 4 fitted with the hygroscopic pad 14 and move away from the end 29 of the base 5 after insertion of the support 4 fitted with the hygroscopic pad 14. In this way, the suction device 28 can in use (that is, when suctioning during insertion of the support 4 fitted with the hygroscopic pad 14) rests on (or in any case be very close) to the end 29 of the base 5 without, at the same time, hindering in any way the movement of the base 5 by the effect of the movement of the feed conveyor 20; in fact, the suction device 28 is brought into contact with the end 29 of the base 5 only when the base 5 is stopped in the transfer station S9 and is kept at a certain distance from the end 29 of the base 5 when the base 5 moves (entering in the transfer station S9 and exiting from the transfer station S9). As illustrated in FIG. 9, the suction device 28 is supported by an arm 32, which is arranged radially, is mounted axially movable, and is connected to the frame at a central area of the feed conveyor 20 (i.e. at the rotation axis 21 of the feed conveyor 20).

It is important to note that the suction device 28 has not only the function of generating suction that effects the inside of base 5, but also has the function of providing a mechanical contrast to the base 5 during the insertion of the support 4 fitted with the hygroscopic pad 14: when the support 4 fitted with the hygroscopic pad 14 is forcefully inserted through the end 30 of the base 5, the end 29 of the base 5 rests on the suction device 28 which keeps still the base 5 itself providing a contrast to the axial thrust exerted by the insertion.

The suction that is generated inside the base 5 by the suction device 28 acts on the hygroscopic pad 14 by "pulling" the hygroscopic pad 14 towards the end 29 of the base 5 and thus facilitating (allowing) a full entering of the hygroscopic pad 14 itself inside the base 5. In other words, the suction inside the base 5 "pulls" towards the end 29 of the base 5 the hygroscopic pad 14 and therefore the hygroscopic pad 14 is (highly) facilitated to completely enter into the base 5. In addition, the suction that is generated inside the base 5 by the suction device 28 acts on the hygroscopic pad 14 in a perfectly symmetrical and homogeneous way without therefore creating unwanted deformations of the hygroscopic pad 14 itself.

According to a preferred, but not binding, embodiment, the coupling unit 25 comprises a compression device 32, which is arranged in the transfer station S9 in a fixed position so as to be interposed between the seat 19 of a gripping head 18 carrying a support 4 fitted with the hygroscopic pad 14 and a seat 22 carrying a base 5. Accordingly, each support 4 fitted with the hygroscopic pad 14 to insert inside the corresponding base 5 must pass through the compression device 32 that compresses transversely (in an elastic way) the hygroscopic pad 14 immediately upstream from the base 5 carried by the seat 22.

Figure 10:
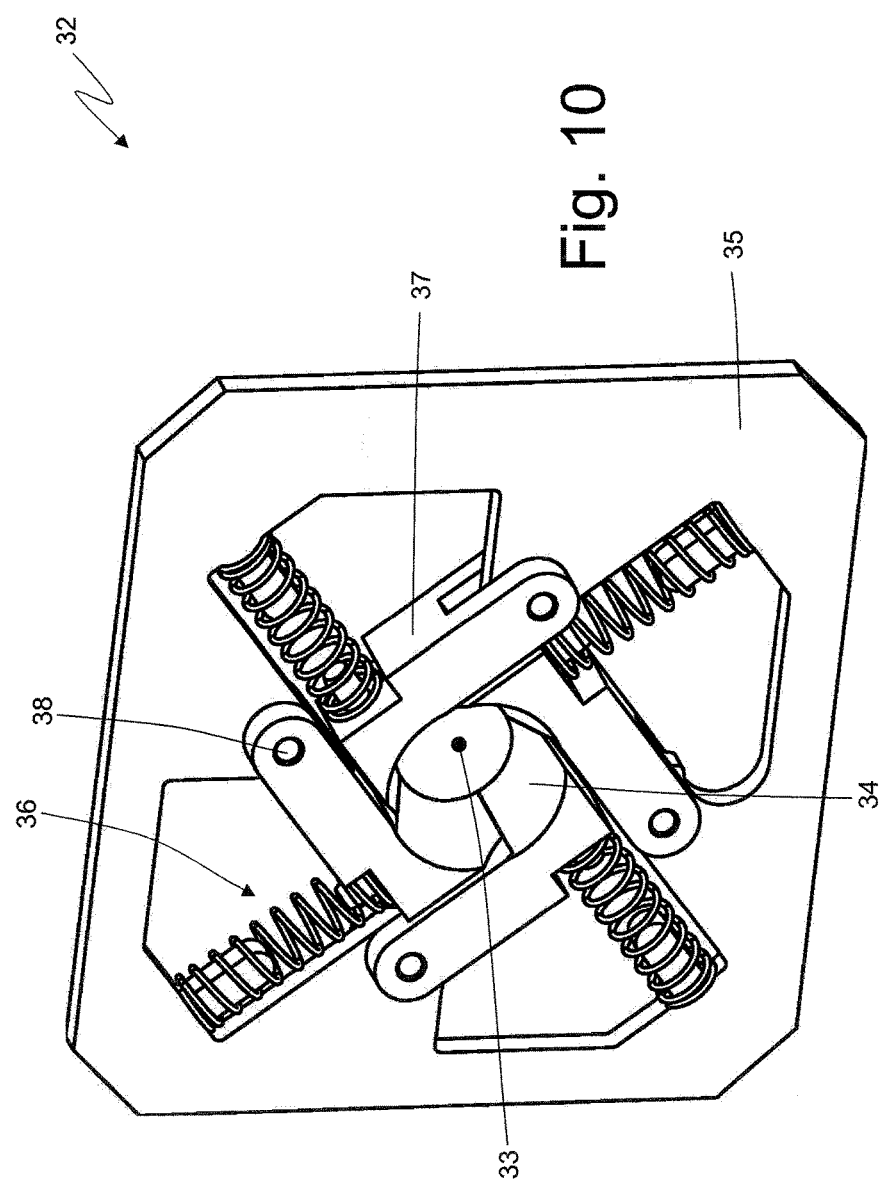
FIG. 10 is a perspective view of a compression device of the application station of the bases of FIG. 7.

As illustrated in FIGS. 10 and 11, the compression device 32 has a through duct 33, which places the seat 19 in communication with the seat 22 (being traversed in use by the support 4 fitted with the hygroscopic pad 14) and has a truncated-cone shape that progressively reduces its internal diameter towards the seat 22. In other words, the through duct 33 has a substantially circular cross section having a diameter variable along its length: the duct 33 is wider (i.e. of greater diameter) at the seat 19 (i.e. at the entering of the support 4 fitted with the hygroscopic pad 14) and the duct 33 is narrower (i.e. of smaller diameter) at the seat 22 (i.e. at the exiting from the support 4 fitted with the hygroscopic pad 14).

Preferably, the compression device 32 comprises at least two opposite walls 34 delimiting the duct 33 and are mounted transversely movable to vary the internal diameter of the duct 33 by moving closer or further apart from one another. In the preferred embodiment illustrated in the attached figures, the compression device 32 comprises four opposite walls 34 (said number represents an optimal compromise between robustness, functionality and manufacturing simplicity), but of course two, three, five, six, seven, eight (or even more) opposite walls 34 may be provided.

The compression device 32 comprises a fixed frame 35 which movably supports the opposite walls 34 and a plurality of elastic elements 36 (for example but not necessarily helical springs), each of which acts on a corresponding wall 34 to push the wall 34 itself towards a position of minimum diameter for the duct 33. In other words, each elastic element 36 is compressed between the corresponding wall 34 and the frame 35 so as to push the wall 34 towards the center (or towards a position of minimum diameter for the duct 33). According to the embodiment illustrated in FIG. 10, each wall 34 is connected to the frame 35 by means of an arm 37 which at one end supports rigidly the wall 34 and at the opposite end is hinged to the frame 35 by means of a hinge 38 to rotate freely with respect to frame 35 itself.

Thanks to the presence of the elastic elements 36, the compression device 32 is able to apply to the support 4 fitted with the hygroscopic pad 14 that passes through the compression device 32 itself a substantially constant force of compression, while simultaneously ensuring a self-adaptation of the diameter of the duct 33 to the conformation of the support 4 fitted with the hygroscopic pad 14. In this way to the support 4 fitted with the hygroscopic pad 14 a substantially constant force of compression is always applied which is able to elastically deform (compress) the hygroscopic pad 14 without damaging in any way the components enclosed by the hygroscopic pad 14 (the electrodes 6 and 7, the electronic circuit 13, the support body 12 and the heating member 8) and does not damage, in any way, the support 4. In this regard it is important to observe that the walls 34 have a limit position (illustrated in FIG. 10) of minimum diameter for the duct 33 beyond which the walls 34 cannot further move closer; said limit position is determined by the mutual contact of the walls 34 (as illustrated in FIG. 10) and ensures that the components enclosed by the hygroscopic pad 14 (the electrodes 6 and 7, the electronic circuit 13, the support body 12 and the heating member 8) will not be subjected to excessive mechanical stress.

With reference to FIGS. 11-14, in the following the insertion of a support 4 fitted with the hygroscopic pad 14 and carried by the seat 19 of a gripping head 18 to a corresponding base 5 carried by a seat 22 is described.

Figure 12:
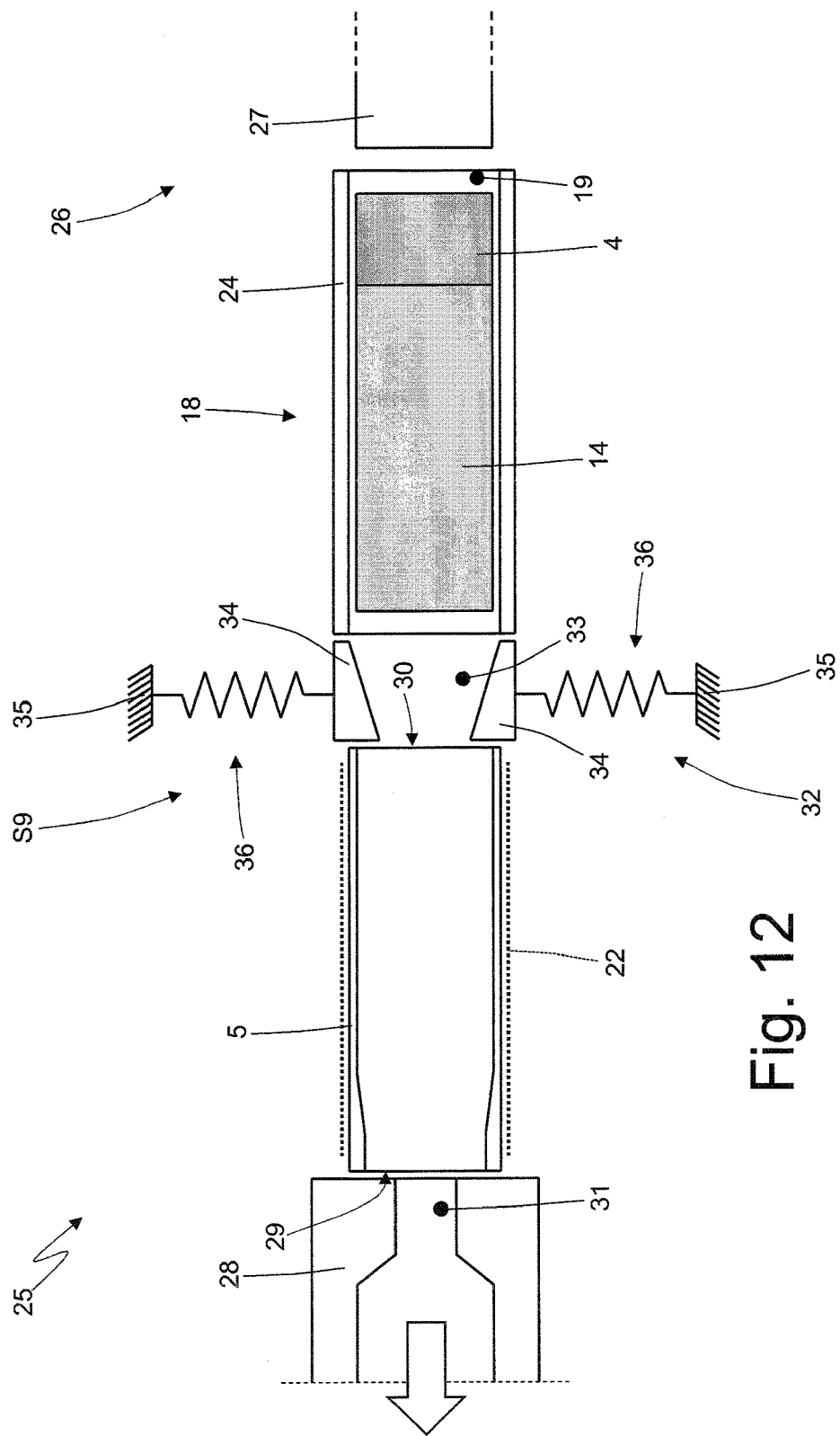
Figure 13:
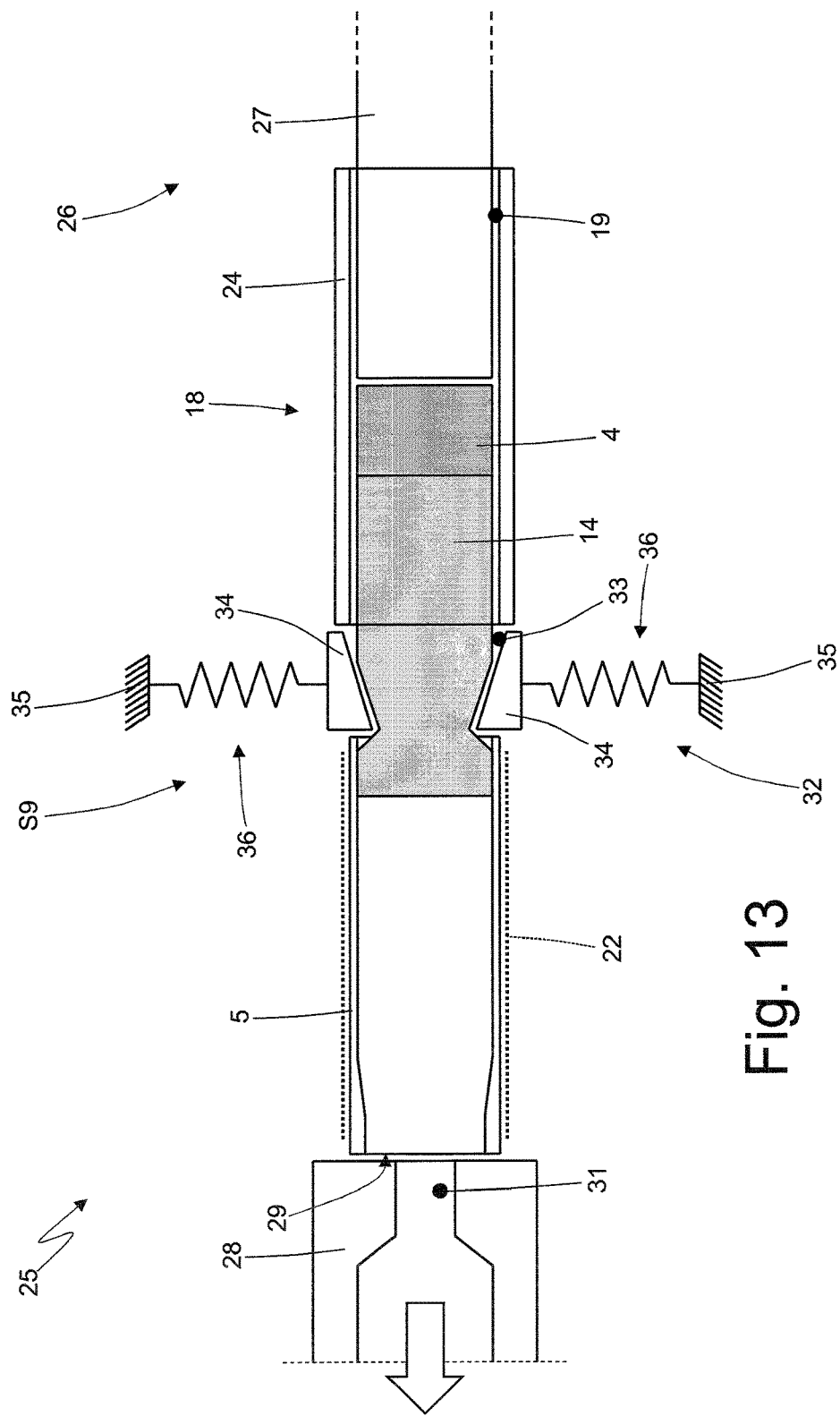
Figure 14:
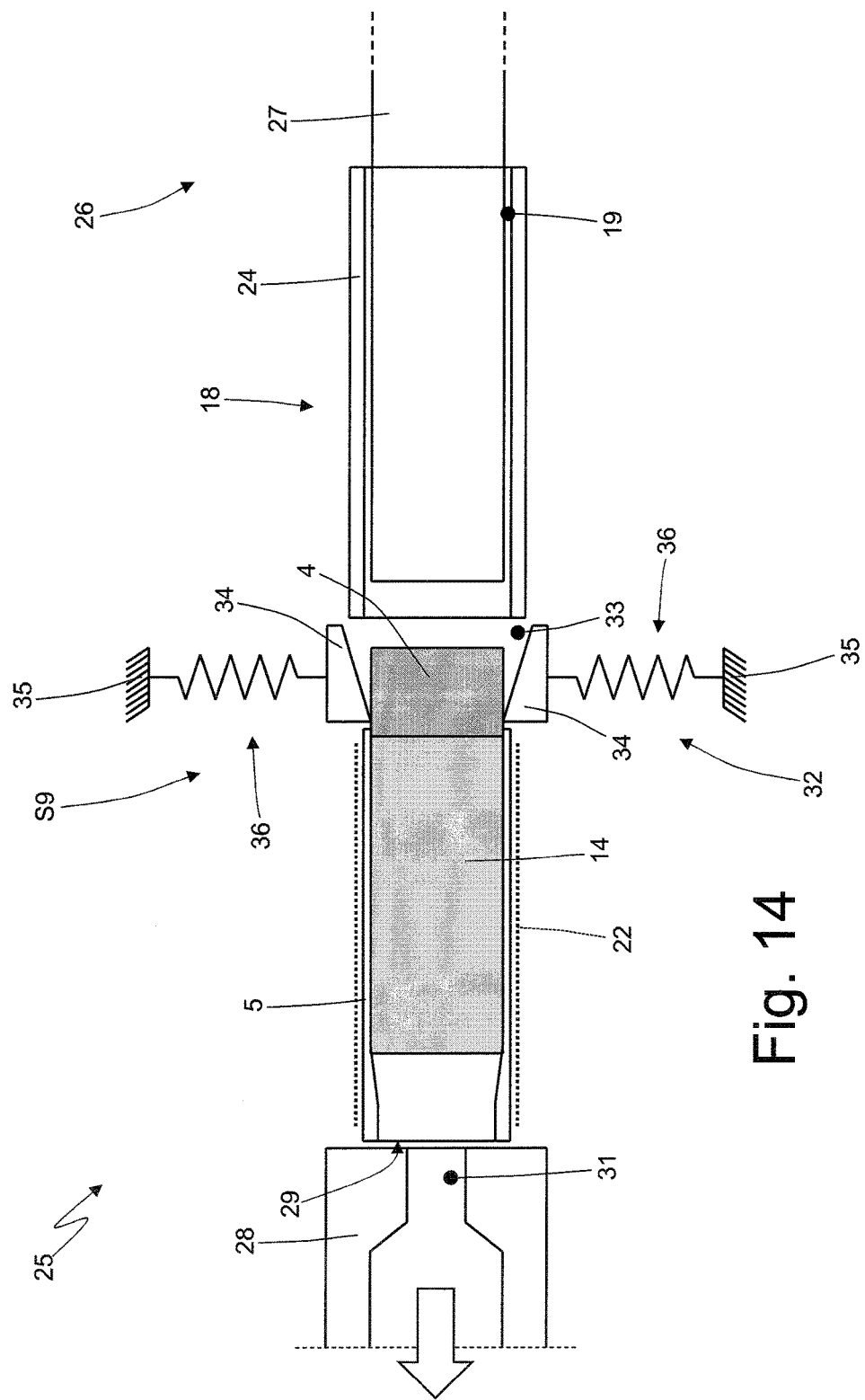

Initially, and as illustrated in FIG. 11, the seat 19 of the gripping head 18 carrying a support 4 fitted with the hygroscopic pad 14 (in addition, of course to other components previously described in detail) and the seat 22 are stopped in stand-by and in mutual axial alignment in the transfer station S9. Subsequently and as illustrated in FIG. 12, the suction device 28 is moved axially to rest on the end 29 of the base 5, and then the suction is activated that acts inside the base 5 itself; this movement of the suction device 28 also carries the base 5 in abutment onto the compression device 32 (or rather onto the walls 34 delimiting the duct 33 of the compression device 32) so that the hygroscopic pad 14 compressed by the compression device 32 enters the base 5 immediately downstream from the compression device 32, therefore without losing the compression imparted by the compression device 32 itself. At this point and as illustrated in FIG. 13, the pusher 27 of the transfer device 26 advances axially entering into the seat 19 of the gripping head 18 to push out (i.e. extract) from the seat 19 the support 4 fitted with the hygroscopic pad 14 and then insert the support 4 fitted with the hygroscopic pad 14 in the base 5 passing through the duct 33 of the compression device 32; in this step, the hygroscopic pad 14 is elastically compressed by the compression device 32 immediately before entering the base 5 and is also "pulled" inside the base 5 by the action of suction generated by the suction device 28. As illustrated in FIG. 14, when the support 4 enters into the duct 33 of the compression device 32, the walls 34 delimiting the duct 33 are widened enabling a smooth passage to the support 4 through the duct 33; then the support 4 can arrive without problems in contact with the end 30 of the base 5 in which the support 4 is fitted due to the thrust of the pusher 27 of the transfer device 26 (as mentioned earlier, said thrust is contrasted by the transfer device 28 that acts as a mechanical stop to keep the base 5 in position). Finally, when the insertion of the support 4 fitted with the hygroscopic pad 14 is completed the pusher 27 of the transfer device 26 moves away from the support 4 returning to the initial position illustrated in FIG. 11, the suction device 28 interrupts the suction action and moves away from the end 29 of the base 5 returning to the initial position illustrated in FIG. 11, and then the two feed conveyors 16 and 20 are driven by one step to restart the insertion cycle with new products.

It is important to note that the hygroscopic pad 14 folded into a tube has the ability to elastically deform without damage, and therefore undergoes a significant radial compression in crossing the compression device 32; instead, the base 4 is much more rigid than the hygroscopic pad 14 folded into a tube and does not have the ability to elastically deform to any appreciable extent and therefore does not undergo any significant radial compression in crossing the compression device 32. Said result is obtained in a completely autonomous way thanks to the fact that the compression device 32 applies a substantially constant radial force of compression (and therefore only sufficient to deform the hygroscopic pad 14 without damaging the support 4) and above all it is able to vary the diameter of the duct 33.

Figure 15:
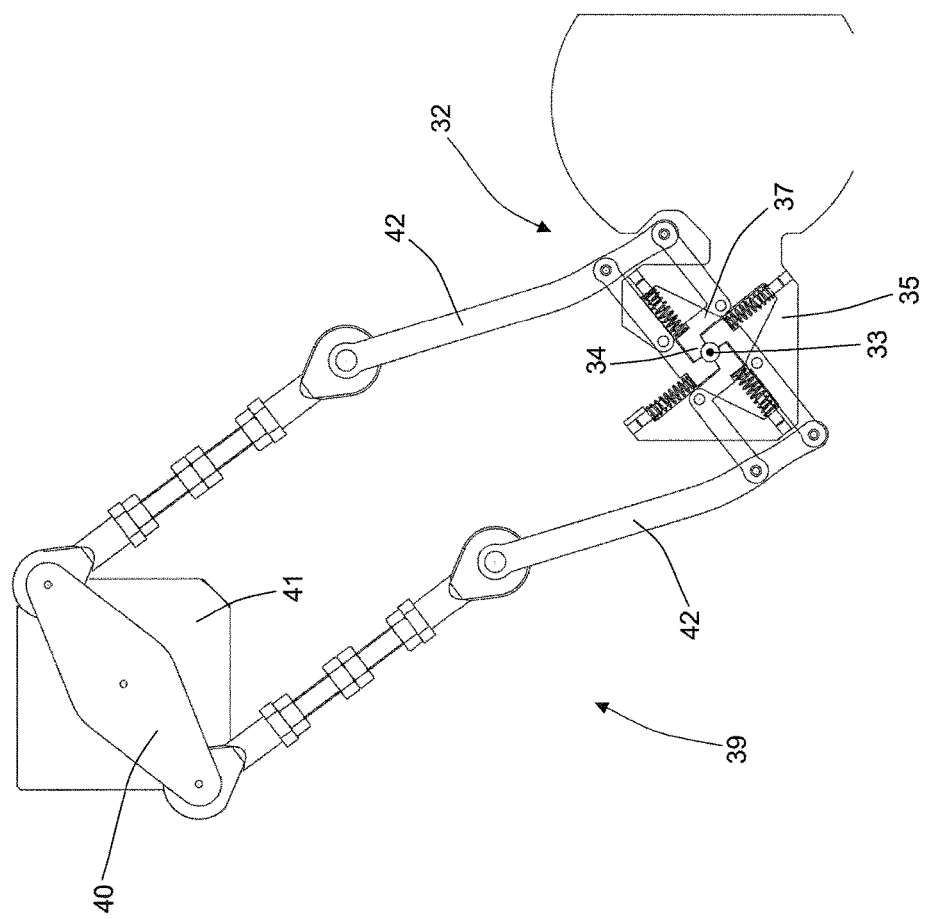
FIGS. 15 and 16 are two schematic views and in two different operating configurations of an alternative of the compression device of FIG. 10.
Figure 16:
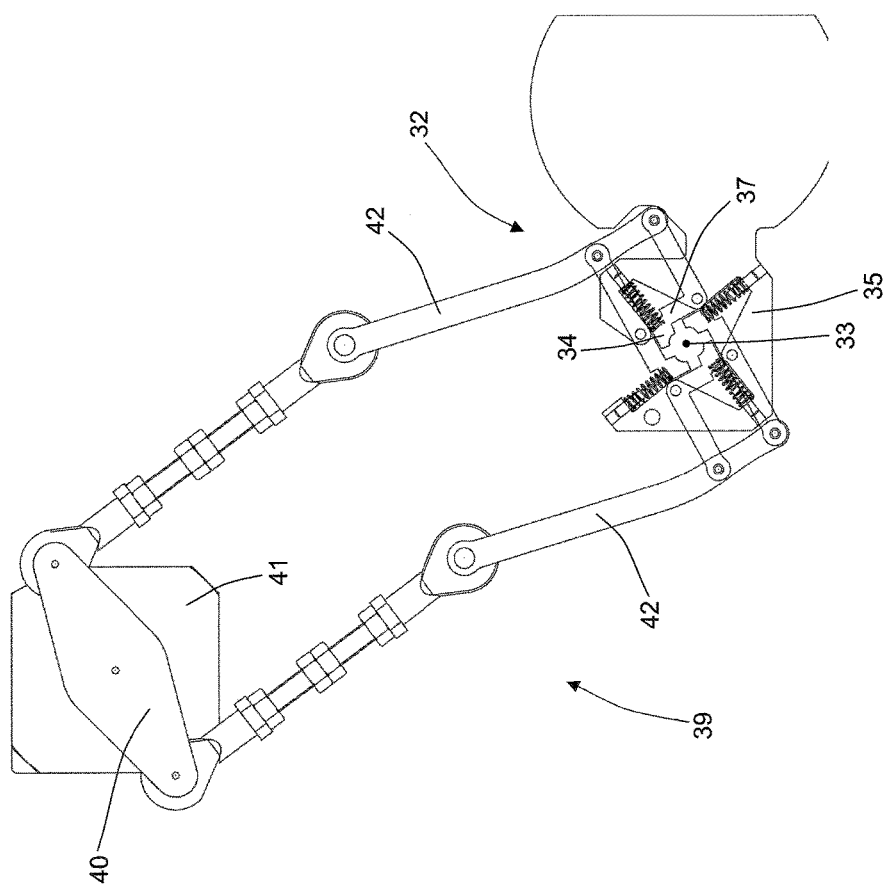

In the embodiment illustrated in FIGS. 9 and 10, the compression device 32 is completely passive, i.e. causes a displacement of the walls 34 only due to the elastic force generated by the elastic elements 36. In the alternative illustrated in FIGS. 15 and 16, the compression device 32 is active, i.e. comprises an actuator 39, that acts on the walls 34 to move the walls 34 closer or apart, thus varying the internal diameter of the duct 33. The actuator 39 comprises a rocker arm 40 which is hinged to a fixed frame 41 and is rotated by a motor (typically electric, for example of step type, which is mechanically connected to the rocker arm by means of a gear transmission that is gearing down the rotary movement of the motor). In addition, the actuator 39 comprises two arms 42 (centrally articulated), each of which connects a corresponding end of the rocker arm 40 to two arms 37 supporting the walls 34: each arm 42 transmits the rotation movement of the rocker arm 40 to two arms 37 carrying the walls 34 and therefore by rotating the rocker arm 40 a rotation of the arms 37 carrying the walls 34 is thus determined, and therefore a radial displacement of the walls 34 carried by the arms 37 (as clearly visible by comparing FIG. 15 in which the duct 33 has the minimum diameter with FIG. 16 in which the duct 33 has the maximum diameter). Obviously, the rocker arm 40 can assume all the intermediate positions between the minimum diameter for the duct 33 (illustrated in FIG. 15), and the maximum diameter for the duct 33 (illustrated in FIG. 16). In use, the movement of the walls 34 (controlled by the rocker arm 40) is synchronized with the advancement of the pusher 27 of the transfer device 26, i.e. with the proceeding of the insertion of the support 4 fitted with the hygroscopic pad 14 in the base 5. In other words, the movement of the walls 34 (controlled by the rocker arm 40) is controlled as a function of the axial position of the pusher 27 of the transfer device 26 (i.e., the axial position of the support 4 fitted with the hygroscopic pad 14) measured by a suitable position sensor.

The coupling unit 25 described above has numerous advantages. First, the coupling unit 25 described above is particularly effective and efficient, as it allows to operate quickly (i.e. with a very high hourly productivity) while ensuring the integrity of all the components of the cartridges 2; in particular, the coupling unit 25 ensures at the same time both a great precision in positioning the hygroscopic pads 14, and a very gentle treatment of the hygroscopic pads 14 that completely preserves the integrity of the hygroscopic pads 14 themselves (thus ensuring at the same time an overall excellent production quality). In addition, the coupling unit 25 described above always guarantees a perfect entering of the hygroscopic pads 14 into the bases 5 thanks to the action of the suction device 28 (described in detail above); i.e. the hygroscopic pads 14 always enter completely inside the respective bases 5, thus avoiding that a flap of a hygroscopic pad 14 may remain out of the base 5 and protrude from the base 5 itself).

In addition, the coupling unit 25 described above is also easy and inexpensive to produce, since it is composed of structurally simple elements which have few and easy movements to perform.

The invention claimed is:

1. A coupling unit (25) for inserting a support (4) fitted with a hygroscopic pad (14) in a base (5) during the manufacture of a disposable cartridge (3) for an electronic cigarette (1); the coupling unit (25) comprising:

a first seat (19) that accepts the support (4) fitted with the hygroscopic pad (14);

a second seat (22) that accepts the base (5) and can be axially aligned with the first seat (19); and a transfer device that inserts the support (4) fitted with the hygroscopic pad (14) in the base (5) by applying a relative axial movement between the support (4) fitted with the hygroscopic pad (14) and the base (5);

the coupling unit (25) being characterized in that it comprises a suction device (28), which is coupled to a first end (29) of the base (5) opposite to a second end (30) of the base (5) through which the support (4) fitted with the hygroscopic pad (14) enters, and causes suction that acts inside the base (5).

2. A coupling unit (25) according to claim 1 and comprising a pneumatic suction pump, which generates depression due to the Venturi effect by exploiting a flow of compressed air and is pneumatically connected to the suction device (28).

3. A coupling unit (25) according to claim 1, wherein the suction device (28) is mounted such that it can axially move closer to the first end (29) of the base (5) before insertion of the support (4) fitted with the hygroscopic pad (14) and move away from the first end (29) of the base (5) after insertion of the support (4) fitted with the hygroscopic pad (14).

4. A coupling unit (25) according to claim 1 and comprising a compression device (32), which is placed between the first seat (19) and the second seat (22) and transversely compresses the hygroscopic pad (14) immediately upstream of the base (5) carried by the second seat (22).

5. A coupling unit (25) according to claim 4, wherein the compression device (32) has a through duct (33), which places the first seat (19) in communication with the second seat (22) and has a truncated-cone shape that progressively reduces its internal diameter towards the second seat (22).

6. A coupling unit (25) according to claim 5, wherein the compression device (32) comprises at least two opposite walls (34) that delimit the duct (33) and are mounted so as to move transversely to vary the internal diameter of the duct (33) by moving closer or further away from each other.

7. A coupling unit (25) according to claim 6, wherein the compression device (32) comprises elastic elements (36), each of which acts on a corresponding wall (34) to push the wall (34) towards a position of minimum diameter for the duct (33).

8. A coupling unit (25) according to claim 6, wherein the compression device (32) comprises an actuator (39), which acts on the walls (34) to move the walls (34) closer or apart, thereby varying the internal diameter of the duct (33).

9. A coupling unit (25) according to claim 1 and comprising:

a first feed conveyor (16) supporting a gripping head (18), which has a tubular shape, is composed of two clamshell elements (24) moveable with respect to one another and internally defining the first seat (19); and a second feed conveyor (20), which supports the second seat (22) and partially overlaps the first feed conveyor (16).

* * * * *